(12) United States Patent  
Sirois et al.

(10) Patent No.: US 6,722,015 B2  
(45) Date of Patent: Apr. 20, 2004

(54) ASSEMBLY METHOD FOR STAMPED AND CUPPED LAMINATIONS

(75) Inventors: Robert Sirois, Fort Wayne, IN (US); James J. Holich, Fort Wayne, IN (US); Dennis P. Bobay, Ossian, IN (US); Robert K. Hollenbeck, Fort Wayne, IN (US); David Erdman, Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/682,269

(22) Filed: Aug. 11, 2001

(65) Prior Publication Data

US 2003/0029023 A1 Feb. 13, 2003

(51) Int. Cl.$^7$ ............................ H02K 15/16; H02K 1/00
(52) U.S. Cl. ............................ 29/596; 29/609; 29/598; 310/216; 310/42; 310/254
(58) Field of Search ............................ 29/596, 598, 609, 29/732, 736, 604; 310/154, 254, 156, 216, 217, 42, 261; 72/340, 336, 337, 363, 369

(56) References Cited

U.S. PATENT DOCUMENTS

| 4,264,663 | A | * | 4/1981 | Beenken ................... 428/133 |
|---|---|---|---|---|
| 4,586,236 | A | | 5/1986 | Jones |
| 4,728,842 | A | | 3/1988 | Martin |
| 4,900,636 | A | | 2/1990 | Takenouchi et al. |
| 5,123,155 | A | * | 6/1992 | Neuenschwander .......... 29/596 |
| RE34,667 | E | | 7/1994 | Neumann |
| 5,333,525 | A | | 8/1994 | Schlegel |
| 5,894,182 | A | | 4/1999 | Saban et al. |
| 6,002,191 | A | * | 12/1999 | Saban ........................ 310/216 |
| 6,018,207 | A | | 1/2000 | Saban et al. |
| 6,131,268 | A | * | 10/2000 | Neuenschwander .......... 29/596 |
| 6,233,417 | B1 | | 5/2001 | Saban et al. |
| 6,237,214 | B1 | | 5/2001 | Neuenschwander |

* cited by examiner

Primary Examiner—Peter Vo  
Assistant Examiner—Stephen Kenny  
(74) Attorney, Agent, or Firm—Carr LLP

(57) ABSTRACT

A method and apparatus for progressively cutting, piercing, bending, stacking, and interlocking lamination assemblies from a strip of laminate. The stacked laminations are mechanically interlocked with a staple-style interlock that secures all the laminations in the stack together. All the steps in the process of forming, stacking and interlocking are done within the tool and die assembly, eliminating the need for additional equipment to stack and interlock assemblies.

6 Claims, 2 Drawing Sheets

US 6,722,015 B2

ASSEMBLY METHOD FOR STAMPED AND CUPPED LAMINATIONS

BACKGROUND OF INVENTION

This invention relates generally to systems for forming laminations used in electrical devices, such as those used in the windings for D.C. motor armatures or A.C. rotors and stators. More particularly, the present invention relates to a method and apparatus for automatically producing interlocked laminations from blanks, or strips.

Typically, laminations are created from continuous sheets that are fed through progressive cutting, punching, and bending steps in a tool and die assembly until the desired end configuration is obtained. Once cut to the desired configuration, laminations are typically stacked, or piled together to achieve the required thickness of laminations.

It is desirable to retain the laminations together in a stack of the desired height in some way so the stack of laminations can be moved together in order to undergo further processing.

Various methods and apparatus have been used to fasten the laminations together, including the use of tabs in the laminations which extend below a surface of the lamination and are inserted into a slot formed in the next adjacent lamination. As each lamination is cut out of the blank, or carrier strip, it is pushed out the end of the die and positioned adjacent to the next lower lamination in the stack. Typically, at least the bottom lamination in the stack has the interlock tabs removed to prevent a stack of laminations from becoming interlocked with another stack of laminations.

This method of securing laminations together works fairly well, but part of the assembly method must include a way to align each lamination coming out the end of the die with the laminations in the stack so that the tabs align with the slots in the adjacent lamination. This typically requires piling the disconnected laminations on a spindle, or in a barrel type mechanism that rotates the lamination until the tab is aligned with the slot on the adjacent lamination and drops into that slot. In many situations, once the stack has been made, additional processing must be done to compress the laminations together so the tabs are firmly seated in the slots in order to keep the stack secured together. This step of aligning the laminations in the stack is time-consuming, and often results in decreased output from the manufacturing process. Attempts to speed up this step generally result in an increased number of misaligned laminations, and therefore a higher number of rejected parts.

Accordingly, a continuing search has been directed to the development of a method which can increase the throughput of lamination stacks, while consistently providing stacks that are accurately aligned and properly secured.

Therefore, what is needed is an improved system and method for manufacturing and interlocking laminations.

SUMMARY OF INVENTION

Accordingly, the system of the present invention provides a method of interlocking a lamination that is still attached to the carrier strip to at least one lamination that has already been disconnected from the carrier strip. Performing this interlocking step while a lamination is still attached to the carrier strip eliminates the need for the extra step of having to align the laminations before they can be interlocked. Because the lamination being interlocked is still connected to the carrier strip, it is in a known, fixed position, and can be accurately aligned with the adjacent lamination. Elimination of the time-intensive step of aligning the laminations speeds up production throughput, and reduces failures due to misalignments.

One aspect of the present invention is a method for manufacturing lamination assemblies from a strip of laminate, wherein at least one first lamination and at least one second lamination are cut in the strip, with at least one hole cut in each first lamination and at least one interlock tab in each second lamination. The first lamination is detached from the strip, and the strip is then moved so that the second lamination, still attached to the strip, is positioned adjacent to the disconnected first lamination. The interlock tab on the second lamination, which is inserted through the hole on the second lamination, is bent so that the interlock tab contacts the side of the first lamination in the stack that is opposite to the side adjacent to the second lamination, interlocking the at least one first lamination and the second lamination. The second lamination, which is now interlocked to the at least one first lamination, is then disconnected from the strip.

Another aspect of the present invention is a method for manufacturing lamination assemblies from a strip of laminate, wherein at least one first lamination and at least one second lamination are cut in the strip, with at least one interlock tab on each second lamination. The first lamination is detached from the strip, and the strip is then moved so that the second lamination, still attached to the strip, is positioned adjacent to the disconnected first lamination. The interlock tab on the second lamination is bent around the periphery of each first lamination and the interlock tab is crimped such that it contacts the side of the first lamination in the stack that is opposite to the side adjacent to the second lamination, interlocking the at least one first lamination and the second lamination. The second lamination, which is now interlocked to the at least one first lamination, is then disconnected from the strip.

Yet another aspect of the present invention is a tool and die apparatus for manufacturing an interlocked stack of laminations from a strip of material, comprising a series of dies and punches. At least one die is used for cutting holes in a first lamination, removing the material that is cut. At least one die is used for cutting at least one hole in a second lamination. A die is used for parting at least one first lamination from the strip of material. A stacker positions the second lamination adjacent to the first lamination parted from the strip of material. A punch presses the material from the hole on the second lamination into the corresponding hole on each first lamination and bends the material against the side of the first lamination that is opposite to the side adjacent to the second lamination. A die parts the second lamination, now interlocked to the first lamination, from the strip of material.

In yet another aspect of the present invention a tool and die apparatus is used for manufacturing an interlocked stack of laminations from a strip of material, comprising a series of dies and punches. At least one die is used for cutting at least one first lamination. At least one die is used for cutting at least one second lamination having at least one tab extending from the periphery. A die is used for parting at least one first lamination from the strip of material. A stacker positions the second lamination adjacent to the first lamination parted from the strip of material. A punch bends the tab on the second lamination next to the periphery of each first lamination and against the side of the first lamination that is opposite to the side adjacent to the second lamination. A die parts the second lamination, now interlocked to the first lamination, from the strip of material.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION

Figure 1:
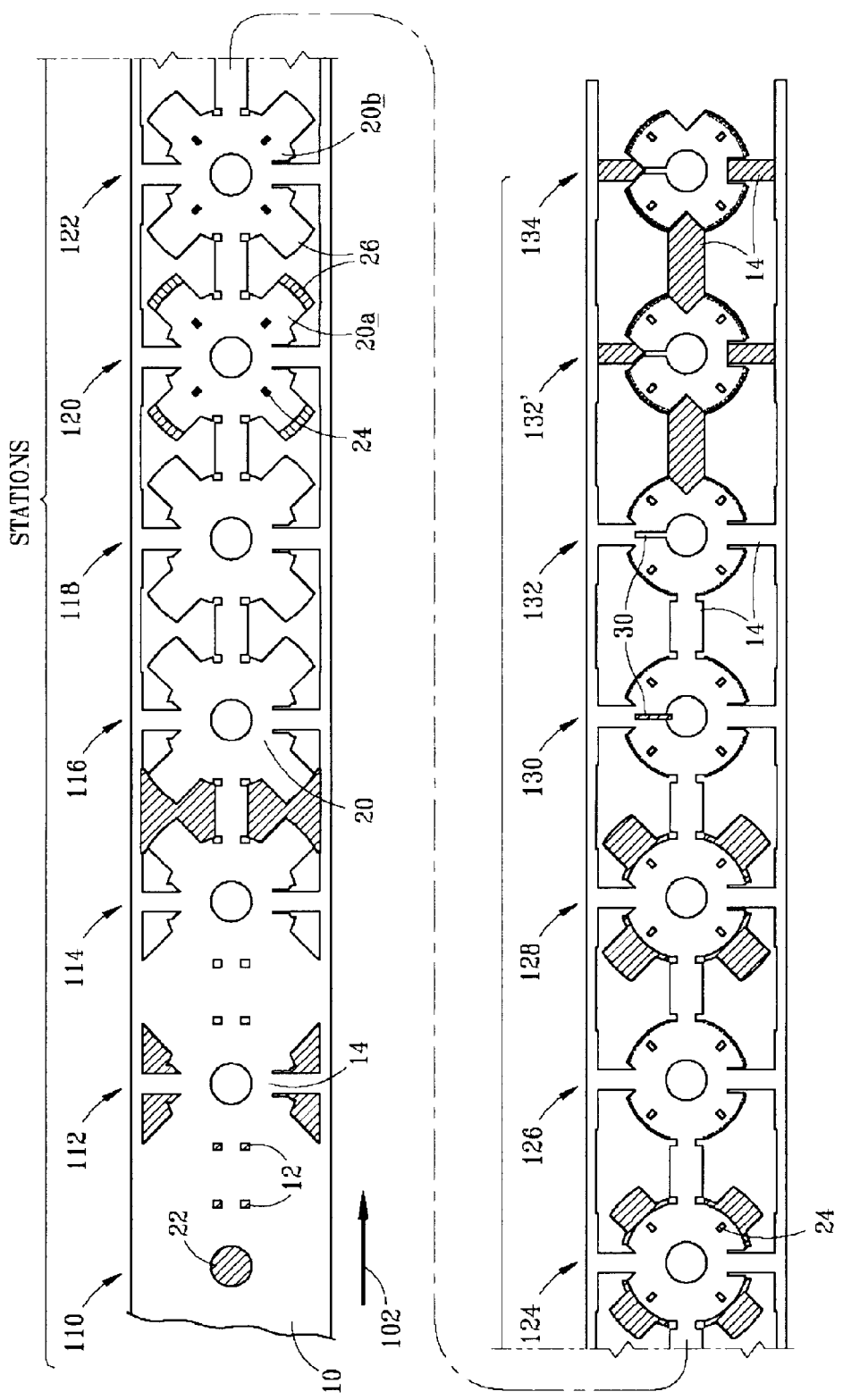
FIG. 1 is a plan view of a piece of laminate strip stock as it appears as it is progressively formed in the punch and die assembly of an embodiment.

As described in further detail below, the present invention utilizes a multi-station punch and die assembly adapted for use in an automatic cycling press, in which a strip of material is moved through a progressive die assembly which performs a further processing step on the material at each station of the unit. The punches and dies may be selectively activated to perform the desired function on only specific laminates.

In the discussion of the FIGURES, the same reference numerals will be used throughout to refer to the same or similar components. In the interest of conciseness, various other components, such as punches, dies, and the like necessary for the manufacture of laminations are considered to be well-known and therefore have not been shown or discussed.

Referring to FIG. 1 of the drawings, a strip of laminate sheet 10 is fed into a tool and die assembly (not shown) in the direction of the arrow 102 and progressively formed within various punches and dies of the tool and die assembly to form a stack of laminations 20 from the strip of laminate 10. The particular tool and die assembly from which the stack of laminates 20 shown results is a preferred embodiment, used to produce staple-interlocked cupped laminations 20 for electrical motor cores. The tool and die assembly comprises a series of individual punches and dies, as described below. The tool and die assembly described below is one preferred embodiment, for which each step in the formation of the particular stack of staple-interlocked cupped laminations 20 for electrical motor cores, is described. However, it is understood that various arrangements and configurations of a tool and die assembly can be used to achieve different end-product laminations, and that all possible combinations are not discussed herein.

At a first station 110 in the tool and die assembly, a center hole 22 for the motor core is pierced, and alignment notches 12 are cut in the strip of laminate 10. These alignment notches 12 correspond with pins (not shown) located at each station in the tool and die assembly. As the strip 10 advances through the stations of the tool and die assembly, the notches 12 are aligned with the pins at each station to ensure the strip 10 is properly positioned for further processing at that station.

At a second station 112, part of the outer shape of the lamination 20 is cut, leaving braces 14 that hold the lamination 20 to the strip 10 during processing. At station 114, the material between subsequent laminations 20 on the strip 10 is cut and removed.

Station 116 is preferably an idle station, wherein no processing is performed on the strip 10. Two different laminations 20a and 20b are alternated to form the stack of staple-interlocked cupped laminations 20 of the preferred embodiment described. In order to generate the different laminations 20a and 20b from a single strip 10, operations that are specific to one lamination 20a or the other lamination 20b are performed at different stations in the tool and die assembly. While some of the operations can be done simultaneously at different stations on the different laminations 20a and 20b, there must be two partially formed laminations ready for simultaneous processing. When the first lamination 20a has been partially formed, it waits in the idle station 116 while the second lamination 20b is being formed at station 114. Station 118 is also preferably an idle station.

At station 120, staple interlock holes 24 are pierced in the first lamination 20a, the material cut away to form the holes 24 is trimmed off, and additional trimming on the arms 26 is performed. The arms 26 on the first lamination 20a are shorter than those on the second lamination 20b. While this work is being performed on the first lamination 20a, the second lamination 20b is waiting in idle station 118.

Figure 2:
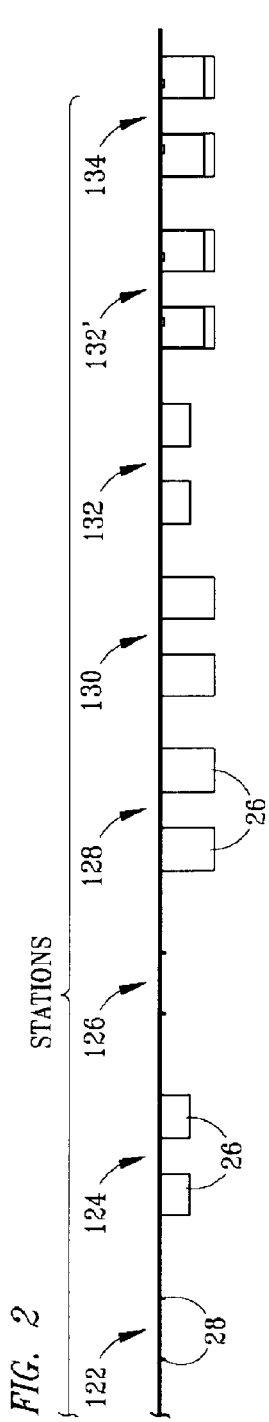
FIG. 2 is a side elevation view of the laminate strip stock during the steps of formation of FIG. 1.

At station 122, staple interlock holes 24 are pierced in the second lamination 20b. As can be seen in FIG. 2, the tabs 28 (the material that was cut to form the holes 24) remain attached to the lamination 20b, but are bent at the attachment point to descend in a plane below the lower surface of the lamination 20b. While the staple interlock holes 24 are being pierced in the second lamination at station 122, the arms 26 on the first lamination 20a are being bent down at station 124. As can be seen in FIG. 2, the arms 26 descend below the lower surface of the carrier strip 10.

Station 126 is an idle station, wherein preferably no processing is performed on the strip 10. The two different laminations 20a and 20b have been partially formed, and at station 126 are now ready to undergo further processing, as described below.

At station 128, the arms 26 on the second lamination 20b are bent down. As viewed in FIG. 2, the arms 26 descend below the lower surface of the carrier strip 10. Because the arms 26 on the second lamination 20b have not been trimmed, they descend slightly lower than the arms 26 on lamination 20a, as can be seen in FIG. 2. While the arms 26 are being bent on the second lamination 20b at station 128, at station 130, a notch 30 is being cut into the first lamination 20a.

Figure 3:
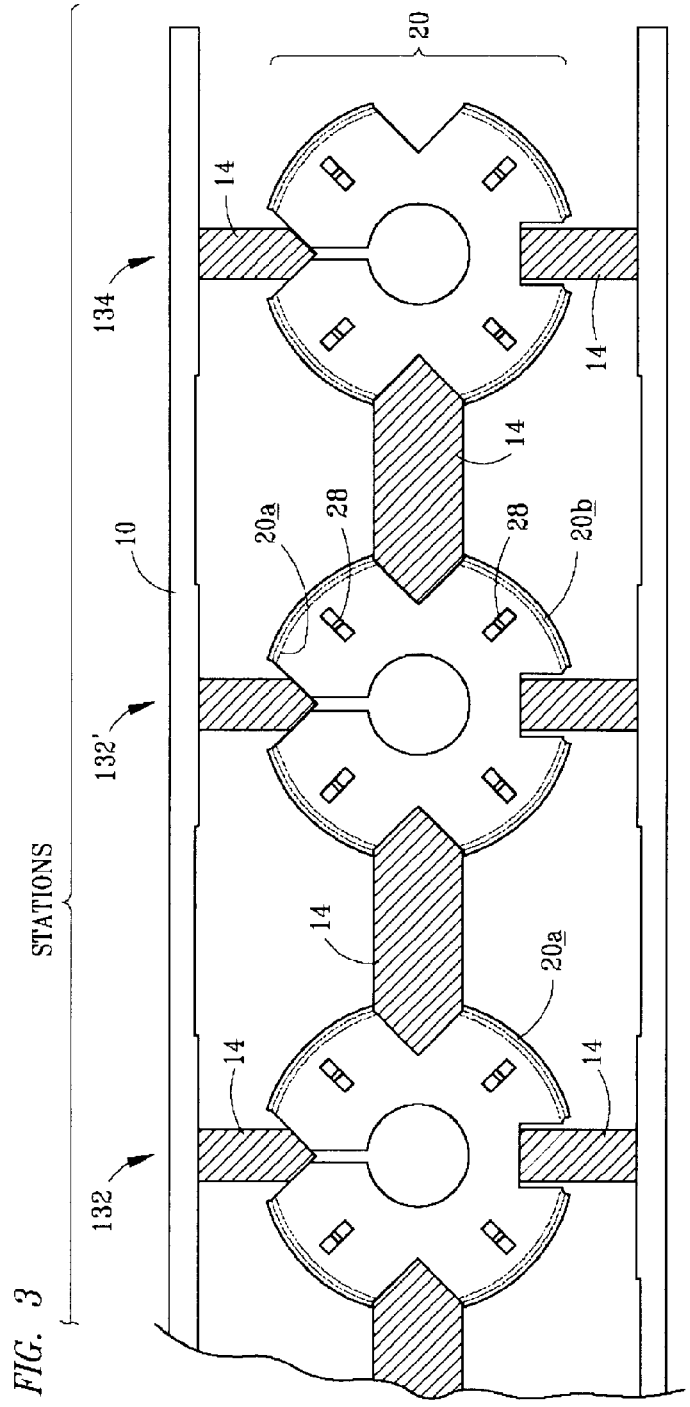
FIG. 3 is an enlarged view of the last portion of the steps of formation of FIG. 1.

As shown in detail in FIG. 3, at station 132, the first lamination 20a is seated on a horn (not shown) in the tool and die assembly, and the braces 14 that hold the first lamination 20a to the carrier strip 10 are removed. While the braces 14 are being removed from the first lamination 20a at station 132, a notch 30 is cut into lamination 20b at station 130. At station 132, the second lamination 20b, which is still attached to the carrier strip 10 is positioned on top of the first lamination 20a, which is seated on the horn (not shown) at station 132 of the die. As seen in FIG. 2, the tabs 28 that were cut in the second lamination 20b at station 122 are pressed down into the staple interlock holes 24 that were cut in the first lamination 20a at station 120, and the tabs 28 are bent up like a staple against the underside of the first lamination 20a, as viewed in FIG. 2. The lamination stack 20, formed by the second lamination 20b, to which the first lamination 20a is now stapled is moved to station 134 of the tool and die assembly.

As can also be seen in FIG. 3, at station 134 the lamination stack 20, formed by the second lamination 20b, to which the first lamination 20a is now stapled, is disconnected from the carrier strip 10 by removal of the braces 14. The lamination stack 20 is then blown out, pushed, or otherwise removed from, the end of the tool and die assembly.

It is understood that the present invention can take many forms and embodiments. Accordingly, several variations may be made in the foregoing without departing from the spirit or the scope of the invention. For example, this process may be used on other laminations than cupped laminations. Similarly, this invention may be used with a lamination stack comprised of numerous laminations that are all substantially similar, rather than the first and second laminations being slightly different, as described in the preferred embodiment, above. With a stack of substantially similar laminations, the only variation between laminations is that the top lamination in the stack is the only one on which the tabs which are interlocked to the lower lamination remain attached. Alternatively, this invention may be used with a lamination stack comprised of numerous laminations that differ in shape and/or size, but are still cut from the same strip and stacked together. In yet another arrangement of the tool and die assembly of the present invention, the stations may be arranged so that the stack of laminations comprises more than one first lamination interlocked to a second lamination. Further, this application is intended to cover such departures from the present disclosure as come within known or customary practice in the art to which this invention pertains.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for manufacturing lamination assemblies from a strip of laminate, the method comprising:

cutting at least one first lamination and at least one second lamination in the strip;

at a first cutting station, cutting at least one hole in each first lamination to be interlocked;

at a second cutting station, cutting at least one hole in each second lamination (corresponding in number and position thereof to the at least one hole of the first lamination, leaving at least one interlock tab in each hole in the second lamination attached to the second lamination on at least one side;

detaching the at least one first lamination from the strip;

removing the strip so the second lamination, attached to the strip, is positioned adjacent to the first lamination disconnected from the strip;

bending the at least one interlock tab on the second lamination through the at least one hole in each first lamination and bending over a portion of the interlock tab sufficiently such that a portion of the tab contacts the side of the first lamination in the stack that is opposite to the side adjacent to the second lamination, interlocking the at least one first lamination and the second lamination; and disconnecting from the strip the second lamination, interlocked to each first lamination.

2. The method according to claim 1, further comprising cutting arms on each lamination and bending the arms to form a cup.

3. A method for manufacturing lamination assemblies from a strip of laminate, the method comprising:

at a first cutting station, cutting at least one first lamination and, at a second cutting station, cutting at least one second lamination with at least one interlock tab in the strip;

cutting and forming a plurality of angled alignment arms;

detaching the at least one first lamination from the strip;

moving the strip so the second lamination, attached to the strip, is positioned adjacent to the first lamination disconnected from the strip;

bending at least one interlock tab on the second lamination around the periphery of each first lamination and bending over a portion of the interlock tab sufficiently such that the portion of the tab contacts the side of the first lamination in the stack that is opposite to the side adjacent to the second lamination, interlocking the at least one first lamination and the second lamination; and disconnecting from the strip the second lamination, interlocked to each first lamination.

4. The method according to claim 3, further comprising cutting arms on each lamination and bending the arms to form a cup.

5. A method for manufacturing lamination assemblies from a strip of laminate, the method comprising:

cutting at least one first lamination and at least one second lamination in the strip;

cutting at least one hole in each first lamination to be interlocked;

cutting at least one hole in each second lamination corresponding in number and position thereof to the at least one hole of the first lamination, leaving at least one interlock tab in each hole in the second lamination attached to the second lamination on at least one side;

cutting arms on each lamination and bending the arms to form a cup;

detaching the at least one first lamination from the strip;

moving the strip so the second lamination, attached to the strip, is positioned adjacent to the first lamination disconnected from the strip;

bending the at least one interlock tab on the second lamination through the at least one hole in each first lamination and crimping the interlock tab such that the tab contacts the side of the first lamination in the stack that is opposite to the side adjacent to the second lamination, interlocking the at least one first lamination and the second lamination;

disconnecting from the strip the second lamination, interlocked to each first lamination.

6. A method for manufacturing lamination assemblies from a strip of laminate, the method comprising:

cutting at least one first lamination and at least one second lamination with at least one interlock tab in the strip;

detaching the at least one first lamination from the strip;

moving the strip so the second lamination, attached to the strip, is positioned adjacent to the first lamination disconnected from the strip;

cutting arms on each lamination and bending the arms to form a cup;

bending at least one interlock tab on the second lamination around the periphery of each first lamination and crimping the interlock tab such that the tab contacts the side of the first lamination in the stack that is opposite to the side adjacent to the second lamination, interlocking the at least one first lamination and the second lamination; and disconnecting from the strip the second lamination, interlocked to each first lamination.

* * * * *